United States Patent [19]

Tank et al.

[11] Patent Number: 5,281,484
[45] Date of Patent: Jan. 25, 1994

[54] HIGH STRESS CAPABILITY, INTERMETALLIC PHASE TITANIUM ALUMINIDE COATED COMPONENTS

[75] Inventors: Eggert Tank, Wernau; Wolfgang Kleinekathöfer, Waldstetten, both of Fed. Rep. of Germany

[73] Assignee: Mercedes-Benz AG, Fed. Rep. of Germany

[21] Appl. No.: 10,312

[22] Filed: Jan. 28, 1993

[30] Foreign Application Priority Data

Feb. 11, 1992 [DE] Fed. Rep. of Germany ....... 4203869

[51] Int. Cl.$^5$ .................................. B22F 7/04
[52] U.S. Cl. .................... 428/552; 428/548; 148/240; 148/528; 148/535
[58] Field of Search ............... 228/181; 428/660, 606, 428/623; 29/460; 420/443, 418; 384/95; 427/257, 250; 123/188; 219/76.1

[56] References Cited

U.S. PATENT DOCUMENTS

| | | | |
|---|---|---|---|
| 4,001,930 | 1/1977 | Tank et al. | 29/460 |
| 4,382,169 | 5/1983 | Rabkin et al. | 219/76.1 |
| 4,869,421 | 9/1989 | Norris et al. | 228/181 |
| 5,049,418 | 9/1991 | Tobin | 427/250 |
| 5,077,140 | 12/1991 | Luthra et al. | 428/660 |

FOREIGN PATENT DOCUMENTS 2252930 8/1992 United Kingdom .

OTHER PUBLICATIONS

Hart-und Hochtemperaturlöten, Diffusionsschwießen, Pionierarbeiten kommen aus dem High-Tech-Bereich, Von Hanns Benninghoff, Technische Rundschau, 3 pages.

*Primary Examiner*—Donald P. Walsh
*Assistant Examiner*—John N. Greaves
*Attorney, Agent, or Firm*—Evenson, McKeown, Edwards & Lenahan

[57] ABSTRACT

Coated components are produced to withstand high stresses and are composed of the intermetallic phase titanium aluminide material for use, in particular, in piston engines, gas turbines and exhaust gas turbochargers. This material has good technical properties but otherwise only a low resistance to oxidation and wear as a result of friction processes. These disadvantages are overcome in that the components are coated, at least on the parts of their surface which are at risk of hot corrosion and/or wear, with a sheet of a solderable nickel-based alloy soldered on under vacuum. A coating thickness of 0.1 to 0.4 mm is adequate. The nickel-based alloys, of which the soldered-on sheet is composed, preferably have a melting point of below 1180° C.

3 Claims, No Drawings

HIGH STRESS CAPABILITY, INTERMETALLIC PHASE TITANIUM ALUMINIDE COATED COMPONENTS

BACKGROUND AND SUMMARY OF THE INVENTION

The present invention relates to coated components having the capability to withstand high stresses and composed of the intermetallic phase titanium aluminide as material, and more particularly, to materials suitable for use in piston engines, gas turbines, exhaust gas turbochargers and the like.

Because of their good technical properties, materials based on the intermetallic phase TiAl (titanium aluminide containing 44 to 48 atomic percent of aluminum) have recently become increasingly important as moving components for, for example, piston engines or gas turbines. Compared with titanium alloys, TiAl materials have, in particular, a lower weight, a higher creep resistance, a good coefficient of thermal expansion and good thermoconductivity. Since the yield point of around 300 MPa does not fall substantially at working temperatures of up to about 700° C., the TiAl materials thus have, with respect to weight, the same specific strength as known nickel superalloys. Therefore, components made of TiAl materials are, in principle, suitable for all applications in which working temperatures of up to about 700° C. occur and in which the component should have a low weight.

A disadvantage of the known TiAl materials is that they have low resistance to oxidation and wear when exposed to friction processes. In practice, attempts have already been made to reduce the disadvantage of the low resistance to oxidation by alloying niobium into the TiAl materials, but the stability of, for example, nickel superalloys has not been achieved in this way. Moreover, the alloying-in of niobium gives rise to an increase in the cost of the TiAl material.

In order to increase the resistance to wear, it is also known to incorporate hard particles, for example composed of titanium diboride, in a material. To this end, the materials must be produced by a powder metallurgical method which is technically laborious and expensive. Moreover, with this production method, the hard material particles are present in the entire material or in the component and not only on the component surfaces at which it is intended to increase the wear resistance. In addition, subsequent machining, for example cutting, of materials permeated by hard material particles is distinctly impaired.

Metal coating of the TiAl material at the endangered surface areas by way of electroplating methods or by a metal spraying process, e.g. a plasma spraying process, usually has little practical success because the adhesion of the metal coating to the base material is too low and the metal coatings therefore frequently peel off when subjected to severe stress.

An object on which the present invention is based is to provide coated components able to withstand high stresses and based on intermetallic phase titanium aluminide as the material.

Another object is to provide a surface coating of the components with a greater resistance to oxidation and wear and a better adhesion to the base material than known coatings.

The foregoing objects have been achieved according to the present invention by coating the components with a coating sheet of a solderable nickel-based alloy soldered on under vacuum at least portions of the component surface subjected to hot corrosion and/or operational wear, the nickel-based alloy having a melting point of below 1180° C and forming, on soldering, at least one of a metallic hard material alloy and hard intermetallic phases with the material and with itself.

We have made the surprising discovery that the surfaces of titanium aluminide components which have been coated according to the present invention have substantially greater resistance both to oxidation and to wear than the untreated surfaces of the material. The coated components are resistant to oxidation up to temperatures of about 900° C., and the resistance to wear when subjected to tribological stress is also substantially improved. This relates both to the field of application of components at a temperature of up to about 200° C. for sliding operations under the effect of lubricants, e.g. engine oil, and the field of application at higher temperatures of up to about 700° C. Hitherto components made of conventional materials which have surface coatings and armoring of special hard alloys, such as stellites or Triballoy alloys, as protection against wear have been used for these applications.

According to the present invention, at least the surface parts of the components which during operation are at particular risk of hot corrosion and/or wear are provided with a coating of a nickel-based alloy soldered on under vacuum.

Soldering of the alloy onto the material under vacuum is carried out in accordance with known technologies. In order to ensure good soldering-on of the alloy, it has proved suitable to use alloys which have a melting point of below 1180° C. In the case of nickel-based alloys which have a higher melting point, soldered coatings which adhere well to the material are not obtained when soldering on under vacuum because of a very vigorous course of reaction between the material and the alloy.

When the coated components are used in practical applications, it has been found that a coating thickness of 0.1 to 0.4 mm is sufficient to protect the components or the selected surface parts of the components against oxidation and wear. Therefore, normal soldering sheets, which are easy to handle, can be used, and a certain grinding overmeasure is also available on surfaces which have to be accurately machined.

The nickel-based alloys, of which the soldering sheets are composed, are also commercially available and known. Soldering sheets which comprise, in addition to nickel as a main constituent, 1 to 19% by weight of chromium, 1 to 3.5% by weight of boron, 1 to 10% by weight of silicon, 1 to 11% by weight of phosphorus and 0.1 to 0.7% by weight of carbon are preferably used. 1 to 35% by weight of manganese and 1 to 12% by weight of tungsten can also be added to the nickel-based alloy in order further to improve the resistance of the soldered-on coating to oxidation and wear.

A nickel-based alloy which comprises, in addition to the main constituent nickel, 6.5% by weight of chromium, 4.5% by weight of silicon, 3% by weight of boron and 2.5% by weight of iron (known in Germany under the trade name L-NiCr7Si5Fe3B3/L-Ni2 and in the USA under the standard designation ASTM/AWS B-Ni2) has preferably been used as the soldering sheet. The melting point of this alloy is about 1000° C.

Nickel-based alloys containing 13% by weight of chromium and 10% by weight of phosphorus (melting point 890° C.) and containing only 11% by weight of phosphorus (melting point 875° C.) (trade names and standard designations L-NiCr13P10 and L-NiP11 and, respectively, B-Ni7 and N-Ni6) have also proved particularly suitable as soldering sheets.

Advantageously, in particular in order to increase the resistance to wear of the coatings formed on the material, tungsten carbide or another hard material or a hard alloy can be added to the nickel-based alloys, in an amount of 10 to 20% by volume and in a particle size of about 10–50 μm.

With regard to the composition of the coatings obtained on soldering the alloys onto the material, the coatings probably contain both phases which are in particular oxidation-resistant and composed, for example, of NiAl and Ni$_3$Al and also phases which are in particular wear-resistant and composed of, for example, chromium silicides and titanium silicides and/or chromium borides and titanium borides.

The present invention is now illustrated in greater detail with the aid of the following examples.

EXAMPLE 1

A plate having dimensions of 100×35×7 mm was separated by spark erosion from a cast block of titanium aluminide containing 45 atomic percent of aluminum and 3 atomic percent of chromium and smoothed on all sides. A 0.2 mm thick, self-adhesive sheet of a solder composed of a nickel-based alloy containing 7% by weight of chromium, 5% by weight of silicon, 3% by weight of iron and 3% by weight of boron (trade name Nicrobraze LM; in the USA ASTM/AWS B-Ni2) was applied to the surface of the plate. The sheet was composed of 95.4% by weight of spherical solder powder having a particle size of 5 to 35 μm in diameter and of 4.6% by weight of a plasticizing organic binder. The sheet stuck onto the plate was melted on over a period of 5 minutes in a vacuum soldering furnace at a temperature of 1050° C. The solder melt spread on the plate in a very thin layer and extended beyond the original sheet size by only about 2 mm. A uniform, metallic-crystalline glossy coating with a coating thickness of 0.18 mm formed on the sheet-covered area of the plate. A metallographic section showed that the newly formed surface coating was made up of, in total, six layers. Whereas the TiAl material has a hardness of about 300 HV 0.2, hardness measurements on the surface coating formed gave hardness value of up to 750 HV 0.2 in the individual layers.

Tests relating to the stability towards atmospheric oxygen were carried out with the coated plate. To this end, a retort furnace was heated to 950° C. and the plate was placed in the furnace and left there for 23 hours. After removal, the plate was cooled in air at room temperature for one hour to 20° C. The plate was then subjected an additional three times to the heating and cooling operation described above. At the end of the fourth cycle the coated surface of the plate showed only an olive green discoloration. On the uncoated surface of the plate multicolored layers of scale about 0.6 mm thick had flaked off irregularly.

Corresponding tests following the same procedure were carried out using nickel-based alloys containing 13% by weight of chromium and 10% by weight of phosphorus and using a single addition of 11% of phosphorus. The two nickel-based alloys had melting points of 890° and 875° C., respectively. The results obtained after carrying out the tests corresponded to those obtained when the first tests were carried out. The surface coating formed with the nickel/phosphorus solder was not as stable as the coating with the nickel/chromium/phosphorus solder; nevertheless, it was more resistant to scaling than the TiAl material itself.

EXAMPLE 2

The aim of this test was to investigate the improvement in the resistance to wear by friction which is achieved by coating the TiAl materials in accordance with the present invention. Ten valve spring retainers were machined from a cast block of titanium aluminide containing 45 atomic percent of Al and 3 atomic percent of chromium. In an engine the valve spring retainers transmit the spring forces, which close the gas-change valves, to the valve shafts. This spring force is about 900N and the valves of associated cams have to be opened against the forces of these springs. As a result of relative movements, high tribological stresses arise between the valve spring and the valve spring retainer. For this reason, both have to be produced from very hard steels or also be provided with hard surface coatings.

Rings plunged from a 0.2 mm thick, self-adhesive sheet of a solder having a composition according to Example 1 were placed on the annular spring support surfaces of five spring retainers and soldered on using the procedure indicated in Example 1. No corresponding sheet was soldered onto a further five spring retainers. The ten spring retainers were then mounted in an engine (alongside a further 14 spring retainers produced from steel in the standard manner) and the engine was run using the following test program:

10 hours at 1,000 revolutions/min
50 hours at 2,000 revolutions/min
50 hours at 4,000 revolutions/min
50 hours at 6,000 revolutions/min.

This test program was run for a total of five cycles, that is to say 800 hours. After removing the spring retainers from the engine, the coated retainers were completely unchanged. Neither the spring support surfaces nor the associated valve springs showed any wear. In the case of the uncoated spring retainers, material wear of about 0.35 mm was found on the spring support surfaces. No material wear was found in the case of the springs, but these showed traces of scuffing.

The advantages achieved with the invention are, in particular, that components of titanium aluminide material provided with a coating are obtained which have both a high resistance to wear and a high resistance to hot corrosion. The coating can be applied to the material in a technically simple process by vacuum soldering and is readily adherent thereto. A uniform coating on the material is obtained which does not show brittle fracturing or cracking.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. High-stress bearing, coated components of an intermetallic phase titanium aluminide material, especially for piston engines, gas turbines, or exhaust turbochargers, wherein the components, at least where their surfaces are exposed to hot corrosional and/or operational wear, are coated with a vacuum-soldered foil of a solderable nickel-based alloy, whereby the nickel-based alloy possesses a melting point below 180° C. and the nickel-based alloy, upon soldering, forms a refractory alloy or a hard intermetallic phase with the components or with itself.

2. In the components according to claim 1, wherein the nickel-based alloy coating soldered onto the component material has a thickness of 0.1 to 0.4 mm.

3. In the components according to claim 1, wherein the nickel-based alloy soldered on comprises nickel as a main constituent, 6.5% by weight of chromium, 3.0% by weight of boron, 4.5% by weight of silicon and 2.5% by weight of iron.

* * * * *